United States Patent [19]
D'Amico

[11] 3,853,825
[45] Dec. 10, 1974

[54] CYANOISOTHIAZOLYL BIS(THIOBENZOTHIAZOLES)

[75] Inventor: John Joseph D'Amico, St. Louis, Mo.

[73] Assignee: Monsanto Company, St. Louis, Mo.

[22] Filed: Apr. 16, 1973

[21] Appl. No.: 351,143

[52] U.S. Cl...... 260/79.5 R, 260/302 A, 260/306.5, 260/793
[51] Int. Cl........................ C08c 11/62, C08f 27/06
[58] Field of Search........ 260/45.8 SN, 79.5 R, 793, 260/306.5, 302 A

[56] References Cited
UNITED STATES PATENTS

| | | |
|---|---|---|
| 1,544,687 | 7/1925 | Sebrell et al..................... 260/306.5 |
| 2,962,481 | 11/1960 | Kerrigan et al. ............... 260/79.5 R |
| 3,281,380 | 10/1966 | Walker .............................. 260/793 |
| 3,308,103 | 3/1967 | Coran et al. .................... 260/79.5 R |
| 3,689,467 | 9/1972 | Boustany et al. .................... 260/793 |

FOREIGN PATENTS OR APPLICATIONS 385,158  3/1965  Switzerland................... 260/79.5 R Primary Examiner—Ronald W. Griffin

[57] ABSTRACT

Cyanoisothiazolyl bis(2-thiobenzothiazoles) of the formula

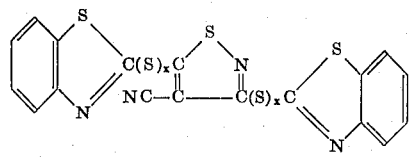

wherein x is one or two which are useful for accelerating the vulcanization of rubber.

4 Claims, No Drawings

CYANOISOTHIAZOLYL BIS(THIOBENZOTHIAZOLES)

This invention relates to a new class of compounds, namely 4-cyanoisothiazol-3,5-diyl-bis(2-thiobenzothiazoles) and to methods of using them as accelerators and vulcanizing agents of rubber.

SUMMARY OF THE INVENTION

I have discovered a class of compounds of the formula

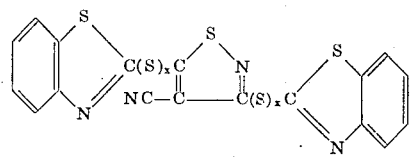

wherein x is 1 or 2 which accelerate the vulcanization of rubber and where x is two, function as primary vulcanizing agents useful as the sole vulcanizing agent or with reduced amounts of other vulcanizing agents. Similar, but not identical, results are obtained with analogous compounds having one or more lower alkyl (1 to 5 carbon atoms), lower alkoxy, halogen or nitro substituents in the benzene ring of the benzothiazole moiety, for example, 5-chloro, 4-methyl, 6-ethoxy, or 6-nitro and it will be understood that they are generally equivalents.

My invention is applicable to rubber formulations containing the usual compounding ingredients such are reinforcing pigments, fillers, retarders, antidegradants, other vulcanizing agents and other accelerators. The various grades of carbon blacks, silicas and similar particulate reinforcing materials as well as clays, whiting and similar inert extenders may be present. Other vulcanizing agents are preferably sulfur vulcanizing agents which include, of course, elemental sulfur, the one most commonly used, and also include any sulfur-containing vulcanizing agent, other than vulcanizing agents of this invention, which upon heating release sulfur in the form available to cross-link rubber. The various forms of elemental sulfur, amine disulfides such as N,N'-dithiobis-(morpholine), amine higher sulfides and polymeric polysulfide vulcanizing agents are all examples of sulfur vulcanizing agents. Any of the retarders and prevulcanization inhibitors known to rubber compounders may be present if desired, for example, N-cyclohexylthiophthalimide. Any of the antidegradants may be present, for example, dihydroquinoline antidegradants, phenolic antidegradants, or phenylenediamine antidegradants. The accelerators perform well alone but may be used in mixtures with other accelerators.

The compounds of my invention may be used in natural and synthetic rubbers or mixtures thereof. Synthetic rubbers that may be used in practice of this invention include cis-4-polybutadiene, butyl rubber, ethylene-propylene terpolymers (EPDM rubber), homopolymers of 1,3-butadiene, homopolymers of isoprene, copolymers of 1,3-butadiene with other monomers for example, styrene, acrylonitrile, isobutylene, and methyl methacrylate. The invention applies to diene rubbers and the terms rubber and diene rubber are synonymous for the purpose of the invention.

The amount of compound to use for accelerating vulcanization depends upon the components in the rubber formulation. Rubber recipes are so varied that it is impossible to define an amount of accelerator which would be advantageous in every instance. A compounder having knowledge of the other ingredients and knowing the process conditions can readily ascertain the amount of accelerator needed. The amount usually is within the range of 0.1 to 5 parts by weight per 100 parts by weight of elastomer, and more often within the range of 0.3 to 2 parts by weight. The preferred usage generally comes within the range of 0.5 to 1.5 parts by weight accelerator. For use of the new compounds as a vulcanizing agent, the amount will generally be larger than for use as an accelerator and may range up to 10 parts by weight. The compounds of this invention are also valuable for use in combination with accelerators previously known examples of which are diphenylguanidine, mercaptobenzothiazole, tetramethylthiuram disulfide, N-t-butyl-2-benzothiazolesulfenamide, 2,2'-dithiobisbenzothiazole, zinc dimethyldithiocarbamate and other guanidine, thiazole, thiuram sulfide and dithiocarbamate accelerators.

DESCRIPTION OF PREFERRED EMBODIMENTS

The compounds of this invention where x is one may be made by reacting 3,5-dimercapto-4-isothiazolecarbonitrile with 2-chlorobenzothiazole in the presence of a hydrogen chloride acceptor, the presence of which is conveniently accomplished by employing the dimercaptan in the form of its alkali metal salt. The intermediate, alkali metal salt of 3,5-dimercapto-4-isothiazolecarbonitrile may be prepared by sulfurization of 2,2-dicyano-1,1-dialkali metal mercaptoethylene. Hatchard, U.S. Pat. No. 3,232,935. The compounds of this invention where x is two may be made by reacting the same intermediate with a 2-benzothiazolesulfenyl halide.

A preparation of the dipotassium derivative is as follows: A mixture of 218.4 grams (1.0 mole) of 2,2-dicyano-1,1-dipotassiomercaptoethylene, 2000 ml. of methanol and 33.6 grams (1.05 mole) of sulfur is refluxed with stirring for one hour. The mixture is filtered hot to remove a small amount of solid material. The methanol is removed at the maximum temperature of 40°C. in vacuo. The solid residue is dissolved in 950 ml. of ethanol and 50 ml. of water at reflux temperature. The solution is filtered to remove trace impurities. The solution is cooled to 0°C., and 300 ml. of ethyl ether and 200 ml. of ethyl acetate are added. After one hour between 0°–10°C., the solid product is recovered by filtering, and is air dried at 25°–30°C. to obtain 198 grams (79 percent yield) of 3,5-dipotassiomercapto-4-isothiazolecarbonitrile. This material is used as shown in the examples below.

EXAMPLE 1

4-Cyanoisothiazol-3,5-diyl bis(2-thiobenzothiazole) is prepared by the following procedure. To a stirred solution of 25 grams (0.1 mole) of 3,5-dipotassiomercapto-4-isothiazolecarbonitrile (prepared above) in 200 ml. of dimethylformamide, 34 grams (0.2 mole) of 2-chlorobenzothiazole is added in one portion at room temperature. After stirring the mixture for 18 hours at 90°–100°C, it is cooled to 30°C. followed by the addition of 800 ml. of water and stirring is continued for 30 minutes at 25°–30°C. The solid product is then recovered by filtration, washed with water until neutral and air dried at 25°–30°C. to obtain 40 grams (90.9 percent yield) of the desired 4-cyanoisothiazol-3,5-diyl bis(2-thiobenzothiazole) as a tan solid which melts at 244°–246°C. Analysis gives 12.56 percent nitrogen and 36.12 percent sulfur compared to 12.72 percent nitrogen and 36.39 percent sulfur calculated for $C_{18}H_8N_4S_5$.

EXAMPLE 2

4-Cyanoisothiazol-3,5-diyl bis(2-dithiobenzothiazole) is prepared by adding 15.9 grams (0.1 mole) of bromine to a solution of 33.0 grams (0.1 mole) of 2,2'-dithiobisbenzothiazole in 200 ml. of carbon tetrachloride at 0°–10°C. over a period of about 10 minutes. The reaction mixture is cooled to 0°C. and to it is added in four portions over a period of about 4 minutes a solution of 25 grams (0.1 mole) of 3,5-dipotassiomercapto-4-isothiazolecarbonitrile in 200 ml. of dimethylformamide. The reaction mixture is prevented from rising above 25°C. by appropriate cooling and is then stirred at 25°–30°C. for 44 hours followed by the addition of 1,500 ml. of water and 25 ml. of 25 percent sodium hydroxide solution. The resulting mixture is cooled to 0°C. stirred at 0°–10°C. for 20 minutes and filtered. The solids collected on the filter are washed with water and dried to obtain 4-cyanoisothiazol-3,5-diyl bis(2-dithiobenzothiazole) in a yield of 91 percent. After purification by slurrying 10 grams of the product in 100 ml. of toluene for 1 hour at 25°–30°C., filtering and drying, it melts at 142°–145°C. Analysis gives 43.07 percent carbon, 1.80 percent hydrogen, 10.91 percent nitrogen and 44.20 percent sulfur compared to 42.83 percent carbon, 1.60 percent hydrogen, 11.10 percent nitrogen and 44.47 percent sulfur calculated for $C_{18}H_8N_4S_7$.

The accelerating and vulcanizing activity of the compounds of this invention are illustrated by incorporating them into the following rubber recipe.

Masterbatch

|  | Parts by Weight |
|---|---|
| Smoked sheets | 100 |
| Carbon black (ISAF) | 45 |
| Zinc oxide | 3 |
| Stearic acid | 2 |
| Hydrocarbon softener | 5 |
| Antidegradant | 2 |
| Total parts | 157 |

| Stock | A | B | C | D | E |
|---|---|---|---|---|---|
| Masterbatch | 157 | 157 | 157 | 157 | 157 |
| Sulfur | — | 1.0 | 1.2 | 2.0 | 2.0 |
| Example 1 | — | — | 1.0 | — | 0.5 |
| Example 2 | 3.0 | 1.0 | — | 0.5 | — |

The stocks are heated at 144°C. for the length of time required to obtain optimum cure. Such time is obtained from curing characteristics determined by means of the Monsanto Oscillating Disk Rheometer described by Decker, Wise, and Guerry in Rubber World, Dec. 1962, page 68. From the Rheometer data the time to optimum cure is determined, and the stocks are heated in a press for that time which, in the case of Stocks A to E above, varies from 30 to 90 minutes. The ultimate tensile strength and tensile modulus at 300 percent elongation are determined for each vulcanizate. Mooney scorch times at 135°C. are determined by means of a Mooney Plastometer. The time in minutes ($t_5$) required for the Mooney reading to rise five points above the minimum viscosity is recorded. Reversion is evaluated with the Rheometer at 164.4°C. The drop in Rheometer units after heating 10 minutes beyond the time of maximum torque is recorded. Resistance of vulcanizates to reversion is a valuable attribute.

The excellent accelerating activity of the new compounds is shown by the data in Table I. The modulus and tensile data are in pounds per square inch.

TABLE I

|  | Stock | | | | |
|---|---|---|---|---|---|
|  | A | B | C | D | E |
| Cure time, minutes | 70 | 30 | 75 | 45 | 90 |
| 300% Modulus, psi | 500 | 1080 | 630 | 1210 | 880 |
| Ultimate Tensile Strength, psi | 1700 | 2810 | 1770 | 2840 | 2320 |
| Ultimate Elongation, % | 550 | 550 | 540 | 530 | 550 |
| Mooney Scorch Time, ($t_5$) min. | 18.0 | 11.4 | 114.2 | 13.7 | 73.4 |
| Reversion — Torque units | 0.3 | 4.0 | 3.6 | 6.4 | 4.4 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising sulfur vulcanizable diene rubber and a vulcanizing amount of a compound of the formula

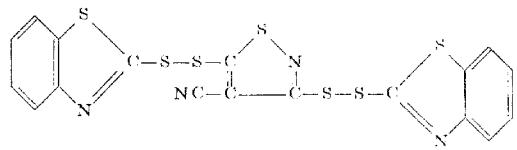

2. A composition comprising sulfur vulcanizable diene rubber, sulfur vulcanizing agent and an accelerating amount of an accelerator of the formula

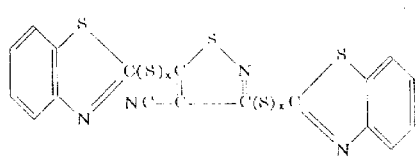

in which x is one or two.

3. A composition of claim 2 in which x is one.

4. A composition of claim 2 in which x is two.

* * * * *